US009294272B2

United States Patent
Lütkenhaus et al.

(10) Patent No.: US 9,294,272 B2
(45) Date of Patent: Mar. 22, 2016

(54) SYSTEM AND METHOD FOR QUANTUM KEY DISTRIBUTION

(76) Inventors: Norbert Lütkenhaus, Waterloo (CA); Xiongfeng Ma, Oxford (GB)

(*) Notice: Subject to any disclaimer, the term of this patent is extended or adjusted under 35 U.S.C. 154(b) by 39 days.

(21) Appl. No.: 14/344,278

(22) PCT Filed: Sep. 12, 2012

(86) PCT No.: PCT/CA2012/050633
§ 371 (c)(1),
(2), (4) Date: Apr. 24, 2014

(87) PCT Pub. No.: WO2013/037062
PCT Pub. Date: Mar. 21, 2013

(65) Prior Publication Data
US 2014/0372812 A1  Dec. 18, 2014

Related U.S. Application Data

(60) Provisional application No. 61/573,137, filed on Sep. 12, 2011.

(51) Int. Cl.
*H04L 29/06* (2006.01)
*H04L 9/08* (2006.01)

(52) U.S. Cl.
CPC ............ *H04L 9/0858* (2013.01); *H04L 9/0855* (2013.01); *H04L 63/062* (2013.01); *H04L 2209/24* (2013.01); *H04L 2209/34* (2013.01)

(58) Field of Classification Search
CPC .................................................. H04L 63/062
USPC ........................................................ 380/278
See application file for complete search history.

(56) References Cited

U.S. PATENT DOCUMENTS

| | | |
|---|---|---|
| 7,181,011 B2 | 2/2007 | Trifonov |
| 7,317,574 B2 | 1/2008 | Zoller et al. |
| 7,430,295 B1 | 9/2008 | Pearson et al. |
| 7,447,386 B2 | 11/2008 | Mitchell, Jr. et al. |
| 7,460,670 B1 | 12/2008 | Elliott |
| 7,706,535 B1 | 4/2010 | Pearson et al. |
| 7,760,883 B2 | 7/2010 | Kuang |

(Continued)

OTHER PUBLICATIONS

International Searching Authority (CA), International Search Report and Written Opinion for International Patent App. No. PCT/CA2012/050633, Oct. 17, 2012.

*Primary Examiner* — Longbit Chai
(74) *Attorney, Agent, or Firm* — Studebaker & Brackett PC

(57) ABSTRACT

A method and system for quantum key distribution (QKD) between a first location and a second location through an intermediate location. The system and method include executing a quantum phase between each of the first and second locations and the intermediate location to determine a first location raw data string at the first location, a first-intermediate raw data string at the intermediate location, a second location raw data string at the second location, and a second-intermediate raw data string at the intermediate location, respectively; calculating, at the intermediate location, announcement data based on a function of the first and second-intermediate raw data strings; announcing, at the intermediary location, the announcement data over a classical channel; and deriving, at each of the first and second locations, a secret key based on the available data and on communications between the first and second locations via a classical channel.

16 Claims, 6 Drawing Sheets

(56) References Cited

U.S. PATENT DOCUMENTS

| | | |
|---|---|---|
| 8,073,336 B2 | 12/2011 | Trifonov |
| 8,842,839 B2 * | 9/2014 | Harrison et al. ............. 380/278 |
| 2007/0076884 A1 | 4/2007 | Wellbrock et al. |
| 2009/0316910 A1 | 12/2009 | Maeda et al. |
| 2010/0299526 A1 | 11/2010 | Wiseman et al. |

* cited by examiner

SYSTEM AND METHOD FOR QUANTUM KEY DISTRIBUTION

CROSS REFERENCE TO RELATED APPLICATIONS

This application claims the benefit of priority of U.S. Provisional Patent Application No. 61/573,137 filed Sep. 12, 2011, which is incorporated herein by reference in its entirety.

FIELD

The present disclosure relates generally to quantum key distribution. More particularly, the present disclosure relates to establishing a secret quantum key through an intermediate node.

BACKGROUND

In cryptography, a secure communication channel can generally be provided if two legitimate users have access to a common, secret key. One of the difficulties in secure communications is to make sure that each legitimate user obtains the secret key without interference or eavesdropping by a non-legitimate party. As such, many secret key distribution systems have been developed over the years. Most recently, cryptographers have begun using quantum techniques to securely distribute/create secret keys (called "quantum key distribution" (QKD)). For example, QKD protocols include the 6-state protocol or the BB84 protocol.

QKD protocols generally comprise two phases: a quantum phase and a classical phase. In the quantum phase, quantum states (for example, qubits) are distributed via a quantum channel. The nature of the quantum channel is such that it is possible to detect if the signal has been tampered with and this allows for stronger security in the secret keys. Upon receipt of the quantum signal, the legitimate users measure the quantum states to obtain classical information about the quantum states. In the classical phase, classical information is exchanged using a specified communication protocol over the classical channel to determine the secret key.

One of the difficulties of quantum key distribution protocols is that quantum channels cannot be established in certain circumstances. For example, quantum states are typically communicated using photons, for example, via optical fiber or through free space (line of sight). In either case, transmitting is limited by signal loss over distance and, particularly in the free space case, may also be limited by environmental factors. In optical fibers, the transmittance of the quantum signal is generally limited by loss which grows exponentially as the distance increases based on, for example, the loss coefficients of the optical fiber. It is anticipated that maximum distances will be a few hundred kilometers.

In order to overcome this problem, conventional systems make use of intermediate nodes between the two legitimate users. These intermediate nodes may be part of a trusted repeater network or a proposed quantum repeater network.

In a trusted repeater network, one or more trusted intermediate nodes are provided between the legitimate end users and point-to-point communications are used among the legitimate users and the trusted nodes. In the point-to-point communications, the QKD protocol is used to establish a secret key between the first legitimate user and the trusted node and then, in the case of only one node, between the trusted node and the second legitimate user. If there are multiple nodes, a secret key would be established between each intermediate node as well.

In a proposed quantum repeater network, the legitimate users each create a maximal entangled state and each keeps one entangled state subsystem and sends the other entangled state subsystem to an intermediate node over a quantum channel. The intermediate node saves these quantum states into quantum memory and performs a Joint Bell measurement on the arriving signals and announces a Bell measurement result via the classical channel. This produces a quantum correlation that is shared between the legitimate users (that is, an entangled state). The entangled state is then used to complete the QKD protocol and establish a secret key, without further involvement from the intermediate node.

While trusted repeater network systems can be effective, it is often necessary to have a large number of complex intermediate nodes between legitimate users or among legitimate users in a network. This can lead to additional costs and complexity. Further, quantum repeater networks have yet to be practically implemented. As such there is a need for improved systems and methods of quantum key distribution.

SUMMARY

It is an object of the present disclosure to overcome or mitigate at least one disadvantage of previous systems and methods.

In a first aspect, the present disclosure provides a method for quantum key distribution (QKD) between a first location (A) and a second location (B) through an intermediate location (T). The method for QKD includes executing a quantum phase between the first location (A) and the intermediate location (T) to determine a first location raw data string ($R_A$) at the first location and a first-intermediate raw data string ($R_{AT}$) at the intermediate location (T); executing a quantum phase between the second location (B) and the intermediate location (T) to determine a second location raw data string ($R_B$) at the second location (B) and a second-intermediate raw data string ($R_{TB}$) at the intermediate location (T); calculating, at the intermediate location (T), announcement data based on a function (F) of the first-intermediate raw data string ($R_{AT}$) and the second-intermediate raw data string ($R_{TB}$); announcing, at the intermediary location (T), the announcement data over a classical channel; and deriving, at each of the first and second locations (A, B), a secret key ($K_{AB}$) based on the first location raw data string ($R_A$), the second location raw data string ($R_B$), and the announcement data and on communications between the first and second locations (A, B) via the classical channel.

This method is intended to provide a reduced complexity at the intermediate location/node in that the physical requirements and processing capacity required can be reduced compared to conventional systems as discussed in further detail herein.

In a further aspect, the intermediate location may be a plurality of intermediate locations. In this case, the plurality of intermediate locations may include either a quantum detector and a quantum emitter such that each intermediate location may include only one type of quantum hardware while passing signals accordingly.

In one particular case, deriving a secret key ($K_{AB}$) may include performing error correction between the first location (A) and the second location (B) over a classical channel. In another case, deriving a secret key ($K_{AB}$) may include performing privacy amplification between the first location (A) and the second location (B) over a classical channel.

In a further aspect, the present disclosure provides a method for QKD at an intermediate location (T). The method for QKD includes executing a quantum phase with a first location (A) over a quantum channel to obtain a first raw data string ($R_{AT}$); executing a quantum phase with a second location (B) over a quantum channel to obtain a second raw data string ($R_{TB}$), calculating announcement data based on a function (F) of the first raw data string ($R_{AT}$) and the second raw data string ($R_{TB}$); and announcing the announcement data over a classical channel.

In another particular case, executing the quantum phase with a first location (A) may include receiving a first quantum signal from the first location (A) over a quantum channel and measuring the first quantum signal to obtain the first raw data string ($R_{AT}$). Similarly, executing the quantum phase with a second location (B) may include receiving a second quantum signal from the second location (B) over a quantum channel and measuring the second quantum signal to obtain the second raw data string (RTB).

In a further particular case, the function (F) may be a parity function and the announcement data may include parity data and measurement bases.

In a further particular case, the announcing of the announcement data may include announcing error correction information.

In other particular cases, the execution of the quantum phase may include determining an error estimate.

According to another aspect herein, there is provided a system for quantum key distribution (QKD) at an intermediate location (T), the system including: a quantum phase system configured to execute a quantum phase with a first location (A) over a quantum channel to obtain a first raw data string ($R_{AT}$) and execute a quantum phase with a second location (B) over a quantum channel to obtain a second raw data string ($R_{TB}$); a processor for calculating announcement data based on a function (F) of the first raw data string ($R_{AT}$) and the second raw data string ($R_{TB}$); and a classical system configured to announce the announcement data over a classical channel.

In a particular case, the function (F) may be a parity function and the announcement data comprises parity data and measurement bases.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides improved methods and systems for quantum key distribution that simplify the distribution protocol and result in lower cost intermediate nodes (sometimes referred to as "repeaters").

Figure 1:
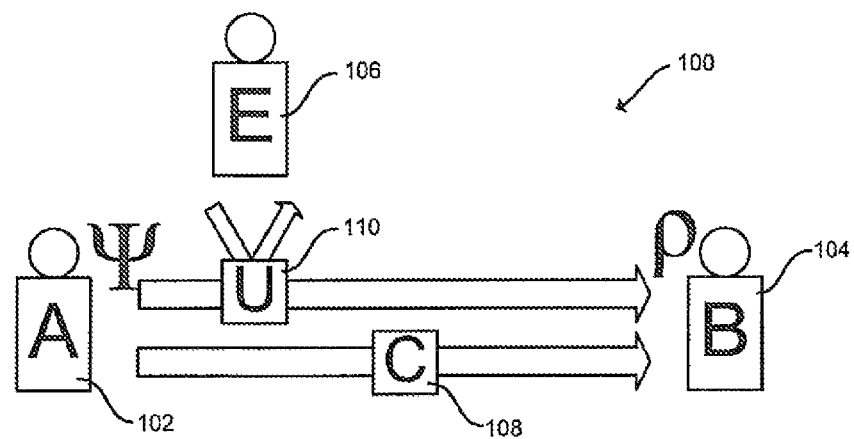
FIG. 1 is an example system for quantum key distribution.

In order to better understand the nature of the systems and methods herein, it is useful to consider a conventional system and method for Quantum Key Distribution (QKD) in further detail. FIG. 1 illustrates a conventional system 100 for providing a secret key using a QKD protocol. The QKD protocol aims to establish a key between two legitimate and remote users, first user A (Alice) 102 and second user B (Bob) 104, in the presence of an eavesdropper (Eve) 106; that is, a non-legitimate user that may intentionally interfere with or intercept information related to the secret key. The secret key is intended to be secret, secure, and random.

QKD protocols generally comprise two phases: a quantum phase and a classical phase.

In the quantum phase, quantum states (for example, qubits) are distributed via a quantum signal between Alice 102 and Bob 104 over a quantum channel 110. The quantum channel 110 may be for example, a fibre optic or line-of-sight channel over which photons can be transmitted. In some cases, the eavesdropper (Eve) 106 may actually be the controller or provider of the quantum channel 110.

In the quantum phase, the quantum signals may be intercepted or interfered with by Eve 106. However, Alice 102 and/or Bob 104 may discover that Eve 106 has obtained information about the quantum signal based on a fundamental aspect of quantum mechanics stating that the process of measuring a quantum system disturbs the system. As such, in order for Eve 106 to obtain information about a quantum signal, Eve 106 will affect the quantum signal such that the signal will be disturbed and Eve 106 can be discovered. In an ideal system, Alice 102 and Bob 104 could discover the presence of Eve 106 from the classical measurement data. However, the quantum channel 110 typically includes noise or imperfections in the transmission line. There may also be noise or imperfections in the users' detectors. As such, it may not be possible to distinguish between these imperfections and the disturbances caused by the presence of Eve 106. In order to guarantee security all of these errors may be assumed to be caused by eavesdropping.

Upon receipt of the quantum signal, Alice 102 and Bob 104 measure the quantum states to obtain classical information (classical measurement data) about the quantum states.

In the classical phase, measurement information related to the measurement of the classical information are exchanged between Alice 102 and Bob 104 over an authenticated classical channel 108 to determine the secret key from the classical information. The classical channel 108 may be one or more of various communication networks, for example, radio, telephone or any of various computer networks, including the Internet. The classical channel 108 may be public, so that it can be accessed by Eve 106. However, the classical channel 108 is assumed to be authenticated such that it cannot be interfered with by Eve 106.

After the exchange of measurement information related to the quantum signal, Alice 102 and Bob 104 then perform Parameter Estimation (PE), Error Correction (EC), and Privacy Amplification (PA) to convert the classical measurement data into a secure key.

Parameter Estimation is used to extract an initial key from the classical measurement data. The parameter estimation can, for example, be based on a set of density matrices compatible with the observed joint probability distribution of measurement outcomes, which are initially determined using a proof technique for the QKD protocol.

Error Correction is carried out between Alice 102 and Bob 104's initial keys in order to reduce errors introduced during the communication. Alice 102 and Bob 104 exchange information over the classic channel 108 so that Bob 104 can correct or remove errors in his version of the initial/raw key, ending up with Alice's initial/raw key. As the classic channel 108 is generally public (in particular, accessible to Eve 106), minimal information about the initial key is sent. The error correction may be conducted using low density parity check codes (LDPC) involving one-way error correction, or a cascade protocol, which uses recursive rounds of sending data to produce a generally identical key with a high probability.

Privacy Amplification is a method for reducing and effectively eliminating the risk that any information has been obtained by Eve 106. Privacy Amplification uses Alice 102 and Bob's 104 error corrected key to produce a new shorter key, such that Eve 106 may only have negligible information about the new key. In one example, Alice 102 chooses at random an element of a two-universal hashing function from a predefined set, and communicates this choice to Bob 104. Alice 102 and Bob 104 independently apply this hash function to their corrected raw key and obtain the final secret key.

As noted above, establishing a secret key over a distance can be limited by signal loss over distance and other factors. As such an intermediate/repeater node can be provided between Alice 102 and Bob 104. Also as noted above, the intermediate node may be a trusted repeater node or a quantum repeater node.

Figure 2:
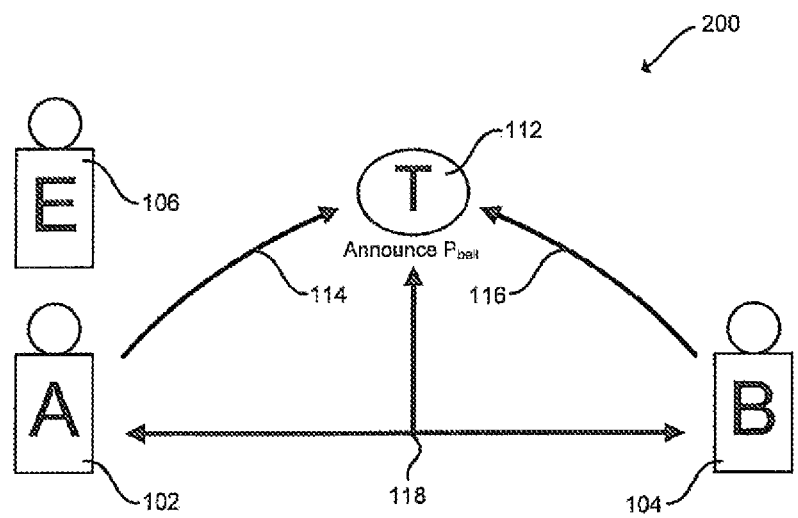
FIG. 2 is an example system for quantum key distribution with an intermediate node.

FIG. 2 illustrates an exemplary system 200 for providing a common secret key using a QKD protocol. The system 200 comprises two legitimate and remote users as in FIG. 1, user A (Alice) 102 and user B (Bob) 104, in the presence of an eavesdropper (Eve) 106. In the system 200 there is an intermediary node (Tom) 112. The system 200 comprises a quantum channel 114 between Alice 102 and Tom 112 and a quantum channel 116 between Bob 104 and Tom 112. The system 200 comprises a classic channel 118 among Alice 102, Bob 104, and Tom 112.

In a conventional trusted repeater network (TRN) system, the intermediary node 112 is a trusted repeater node. Tom 112 performs a QKD protocol with Alice 102 via quantum channel 114 to establish a secret key $K_{AT}$. Tom 112 performs a QKD protocol with Bob 104 via quantum channel 116 to establish a secret key $K_{TB}$. In the traditional TRN system, the quantum channels 114, 116 are direct but, other characteristics, such as being authenticated, do not need to be specified.

Tom 112 now has the two independent secret keys $K_{AT}$ and $K_{TB}$. Tom 112 then performs the parameter estimation and computes a parity function $P_K$ (for example, the bitwise parity of both keys) from $K_{AT}$ and $K_{TB}$, where $P_K = K_{AT}$ XOR $K_{TB}$. Tom 112 announces $P_K$ publicly via a classical channel 118, such that Alice 102 and Bob 104 can determine a common key. In particular, Bob 104 may calculate the common secret key using: $K_{TB}$ XOR $P_K = K_{TB}$ XOR $K_{AT}$ XOR $K_{BT} = K_{TA}$.

The public announcement by Tom 112 of $P_K$ does not contain any information about the resulting common key, thus the key is secure. However, this conventional TRN system is limited as Tom 112 must be involved twice in all steps of the classical phase of the QKD protocol which requires significant computation and communication resources. Further, Tom 112 must be a trusted intermediate node as, at the end of the QKD protocol, Tom 112 has full access to the final secret key.

In a conventional quantum repeater network (QRN) system, the intermediary node 112 is a quantum repeater node. Alice 102 and Bob 104 each determine a maximal entangled state. Alice 102 keeps one entangled state subsystem and sends the other entangled state subsystem $Q_{As}$ to Tom 112 via a quantum channel 114. Bob 104 keeps one entangled state subsystem and sends the other entangled state subsystem $Q_{SB}$ to Tom 112 via a quantum channel 116. Tom 112 performs a joint Bell measurement on the arriving signals $Q_{AS}$, $Q_{SB}$ and announces a Bell measurement result ($P_{Bell}$) via the public channel 118. This announcement allows for determination of a quantum correlation that is shared between Alice's qubits and Bob's qubits. The quantum correlation establishes an entangled state between Alice 102 and Bob 104. Alice 102 and Bob 104 use the entangled state to complete the QKD protocol and establish a secret key, without further involvement from Tom 112.

In the proposed QRN system, Tom 112 has no information about the final secret key and does not need to be trusted. Alice 102 and Bob 104 can verify from their data that Tom 112 followed the protocol. Tom 112 is not Involved in the parameter estimation and does not need to have the computational resources to extract a key from the data. However, the QRN system does require that Tom 112 have a quantum memory and perform a joint measurement on the quantum signals received from Alice 102 and Bob 104. As such, it can be difficult to equip Tom 112 to handle the storage and measurements needed.

Accordingly, it was determined that there is a need to provide a protocol intended to maintain security but decrease the computational or physical (e.g. quantum memories) requirements of the intermediate node 112. Such a reduction is intended to reduce cost and complexity of intermediate nodes. Such an improvement is expected to have particular impact when a satellite is used as an intermediate node because satellites tend to have limited communication and computational capacity as well as strict equipment/physical standards due to power constraints and the harsh environment of space.

Figure 3:
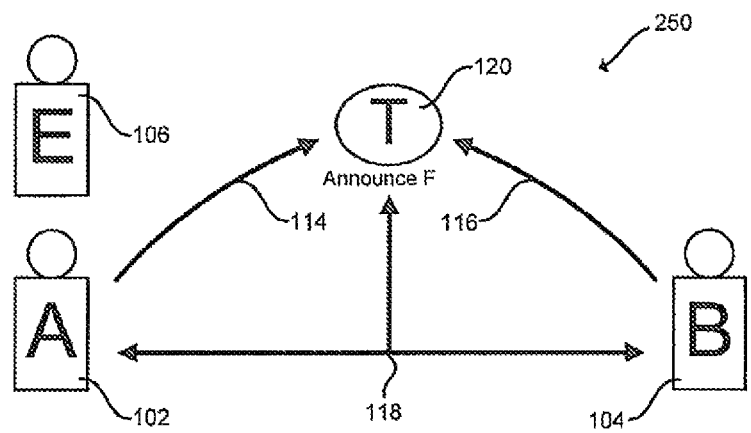
FIG. 3 is an example system for quantum key distribution with an intermediate node according to an embodiment herein.

FIG. 3 illustrates an embodiment of an improved system 250 for QKD. The system 250 is similar to that illustrated in FIG. 2 and similar reference numbers will be used for similar elements. In the improved system, the intermediate node Tom 120 is modified in order to process an improved QKD protocol. In particular, the system 250 is less complex as described further below.

Figure 4:
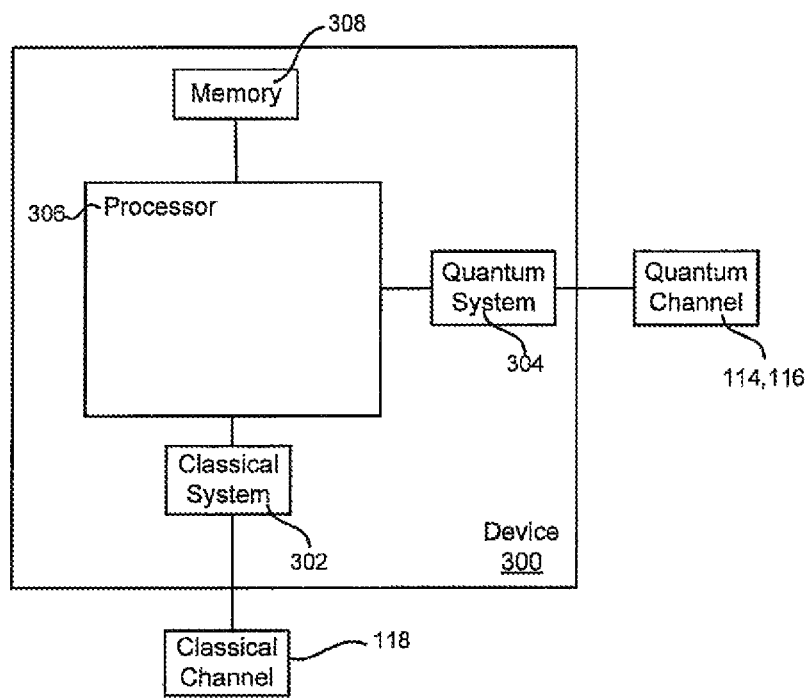
FIG. 4 is a schematic diagram of an intermediate node in accordance with an embodiment herein.

FIG. 4 illustrates an intermediate node 300 for performing a QKD protocol in accordance with an embodiment herein. The intermediate node 300, may be, for example, Tom 120 of FIG. 3. The node 300 includes a classical system 302 comprising a classical receiver and a classical sender for receiving and sending a classical signal over a classical channel 118.

The node 300 also includes a quantum sub-system 304, which may be either a quantum detector for receiving a quantum signal or a quantum emitter for sending a quantum signal. The quantum sub-system 304 interfaces with the quantum channels 114, 116 of FIG. 3. It will be understood that a node 300 may be configured as either a quantum receiver or emitter depending on its location in the network. In a multiple node example, the intermediate nodes may alternate between emitter and receiver in order to provide less complex intermediate nodes.

The node 300 also comprises a processor 306 for processing sending data, measurement data, and classical data related to the signals. The device 300 may also comprise a memory 308 for storing classical data and related information.

Figure 5:
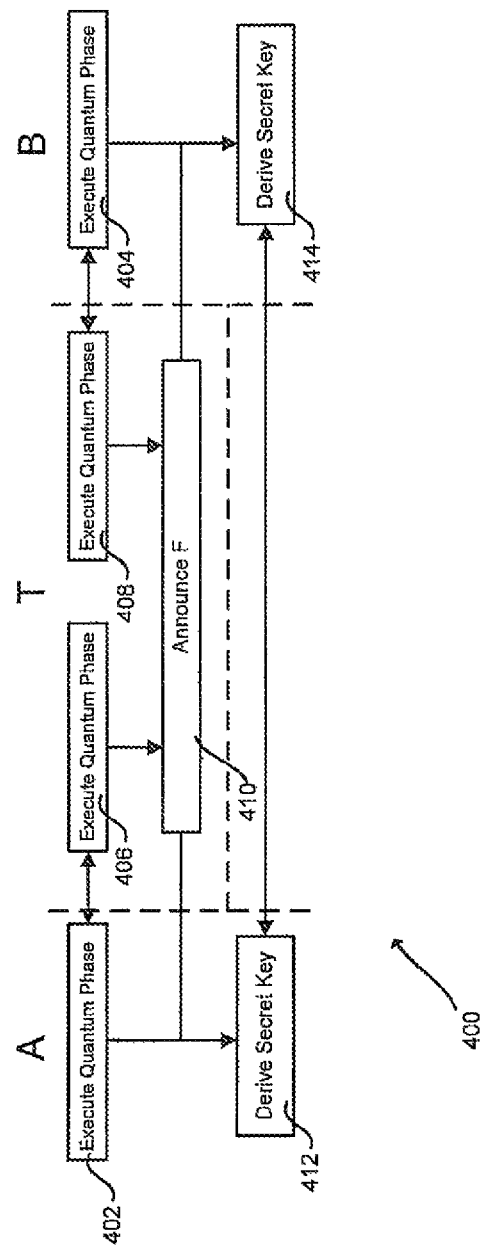
FIG. 5 is a flow chart of a method for quantum key distribution in accordance with an embodiment herein.

FIG. 5 illustrates a method 400 for performing quantum key distribution in accordance with an embodiment herein and making use of the system 250 of FIG. 3. Initially, Alice 102 (at 402) and Bob 104 (at 404) each perform the quantum phase with Tom 120 via the quantum channels 114, 116. The quantum phase does not need to be conducted simultaneously or involve the same quantum protocol. For example, two independent quantum protocols (at 406 and 408, respectively) can be used. In this case, Eve 106 is assumed to have access to the quantum channels 114, 116.

Tom 120 receives and measures the quantum signals and obtains classical information about the quantum signals, including classical measurement data strings and information related to the classical measurement data strings, for example, the basis choices used by Tom 120 in making the measurements. Tom 120 then prepares a function (F) of the classical information to determine announcement data. At 410, Tom 120 then announces the announcement data on classical channel 118. Alice 102 (at 412) and Bob 104 (at 414) use the announcement data together with their own data to determine correlations and establish a secret key between themselves using error correction and privacy amplification.

The proposed protocol is intended to have the advantage that Tom 120 does not need to have the computational resources to extract a secret key from the measurement data as would be required in a conventional TRN system. Instead Tom 120 performs a simple state transfer and measurement and reports on the results. As such, there is a reduced need for computational resources and, further, no quantum memory is required and joint measurements are also not required as would be the case in conventional QRN networks.

Figure 6:
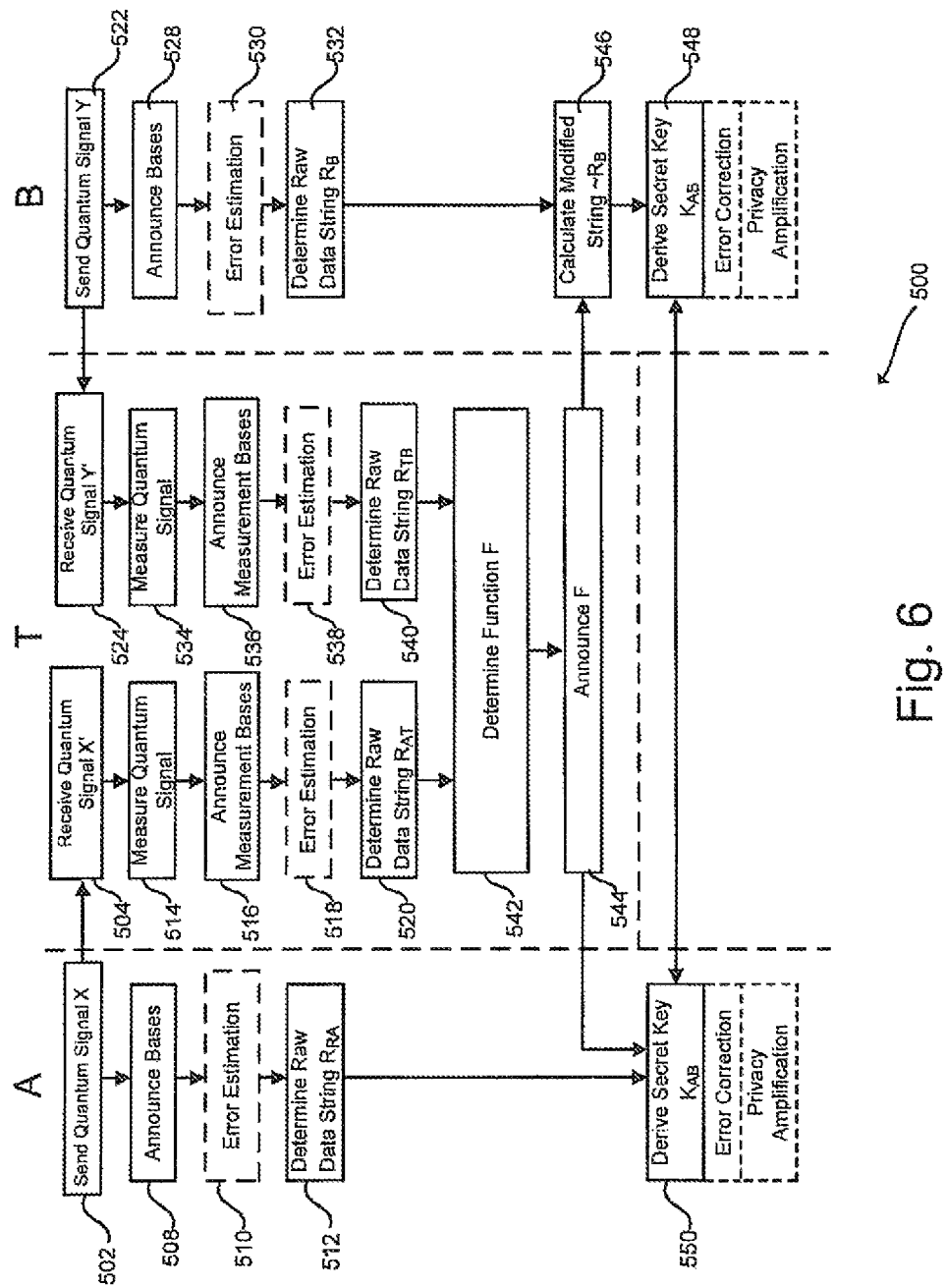
FIG. 6 is a flow chart of a method for quantum key distribution in accordance with another embodiment.

FIG. 6 illustrates another embodiment of a method 500 for quantum key distribution (QKD) showing a particular implementation of the method of FIG. 5. The method 500 for QKD may be performed by Alice 102, Bob 104, and Tom 312 of FIG. 3, for example.

At 502, Alice 102 sends a quantum signal to Tom 120. At 504, Tom 120 receives the quantum signal from Alice. As noted above, it will be understood that the quantum phase (i.e. sending of a quantum signal) is symmetric in the sense that either of Alice or Tom may be the sender and the other the receiver. At 508, Alice announces the bases of the measurements performed in the protocol via the classical channel. At 510, optionally Alice performs an error estimation. At 512, Alice determines a raw data string $R_A$.

At 514, Tom measures the quantum phase of the signal. At 516, Tom announces the bases of the measurements performed in the protocol. At 518, optionally Tom performs an error estimation. During error estimation between Alice and Tom, in its simplest form, one party announces a random subset of its data such that the other party can look up its corresponding subset of data and thus have an estimation of the errors. The choice of who announces the random subset of data and who compares the data is independent of the role in preparation and measurement of the quantum states. At 520, Tom determines a raw data string $R_{AT}$.

At 522, Bob sends a quantum signal to Tom. At 524, Tom receives the quantum signal from Bob. At 528, Bob announces the bases performed in the protocol. At 530, optionally Bob performs an error estimation. At 532, Bob determines a raw data string $R_B$.

At 534, Tom measures the quantum signal from/to Bob. At 536, Tom announces all bases of the measurements performed in the protocol. At 538, optionally Tom performs an error estimation, similar to that discussed above between Alice and Tom. At 540, Tom determines a raw data string $R_{TB}$.

It will be understood that in each of the above, the elements disclosed are performed in a co-ordinated fashion among Alice, Bob and Tom.

At 542, Tom determines an announcement function F that acts on the raw data strings $R_{AT}$ and $R_{TB}$ to provide an announcement result/data. For example, Function F is selected to create a partition of a subset of the raw data strings $R_{AT}$ and $R_{TB}$ by creating sets of data with the same function value.

In a particular case, the function F may include the measurement basis and also a parity function of the measurement results and the announcement result is the parity bits $P_R$ calculated from the measurement results as $P_R = R_{AT}$ XOR $R_{TB}$. It will be understood that the function F does not necessarily include the measurement bases.

At 544, Tom announces the announcement result via the classical channel.

In the case where the announcement by Tom 312 is the parity bits $P_R$, at 546, Bob may calculate a modified string $\sim R_B$, from $\sim R_B = R_B$ XOR $P_R$.

At 548 and 550 Alice and Bob derive a secret key $K_{AB}$ from Alice's raw data string $R_A$, Bob's raw data sting $R_B$, and the announcement result via the public/classical channel. Where the announcement result is the parity bits $P_R$, Alice (at 548) and Bob (at 550) derive a secret key $K_{AB}$ from Alice's raw data strings $R_A$ and Bob's modified string $\sim R_B$ via a public discussion channel using parameter estimation techniques and also using sifting of data based on the various announcements of measurement bases. In one simple protocol, Alice and Bob will discard all events where their respective basis choice disagrees with the basis choice at the intermediate node (Tom). Alice and Bob also perform error correction and privacy amplification in accordance with conventional point-to-point QKD protocols. During the classical communication, Alice and Bob decide whether to abort the QKD protocol, for example, based on too many errors, too small a key, or the like. If they do not abort, Alice and Bob accept the output of the protocol as a secret key.

During this classical communication 548, 550 a substantial amount of classical communication is exchanged to perform the error correction and the privacy amplification. Privacy amplification and error correction also require a substantial amount of computation to execute. Accordingly, there are certain advantages to having Alice and Bob perform error correction and privacy amplification without the involvement of Tom.

The error estimation at 508, 516, 528, and 536 is intended to provide Alice and Bob with a description of all multipartite quantum states shared between Alice, Bob, and Tom, from which the extractable secret key rate for Alice and Bob can be calculated for given announcements by Tom. The error estimation calculation process includes Tom's public announcements on a random subset of signals, for example by external random choices of signals or by random selections by Tom. The error estimation process is intended to determine how much secret key can be extracted by Alice and Bob at 548, 550, for example, to provide an estimate of the amount of privacy amplification that Alice 102 and Bob 104 perform.

In keeping with standard QKD protocols, the systems and methods herein assume the authentication of classical channels to guarantee security of the resulting secret keys.

It will be understood that the method 500 may also be adapted to be performed on larger trusted repeater networks where multiple trusted nodes may be configured in a similar manner and make announcements in a similar way as the intermediate node Tom 120.

In executing the method 500, Tom does not need to have the full computational resources that would ordinarily be necessary to perform full parameter estimation and error correction and privacy amplification in the case of conventional trusted repeater networks. Further, the amount of traffic on the public channels involving Tom is reduced. Still further, Tom does not directly have a clear copy of the final key $K_{AB}$. Although Tom still needs to be trusted to some extent since Tom can compute the final key from its own knowledge and the information being exchanged between Nice and Bob, the level of trust needed is somewhat diminished. In some cases, Alice and Bob may use further encryption (for example, computationally secure encryption) of their public discussion to increase the difficulty for Tom of obtaining a full copy of the key. This may be particularly advantageous in larger multi-node networks.

Other intermediate protocols that involve the use of less than full key development may be understood by one of skill in the art after understanding the concepts disclosed herein. For example, in another embodiment, the method 400 or 500 may further include Tom also announcing partial or full error correction information to Alice and Bob. This option may be used depending on the available processing power and bandwidth of the system.

In any cryptographic protocol, it is important to consider the security proof for the protocol to determine that the key can be safely distributed. The following description is intended to represent an exemplary security proof framework but it will be understood that various security proofs may be available within the framework.

In the security proof framework, each of data X, Y are sent by Alice 102 and Bob 104 and Tom 120 measures/detects the measured outcomes X', Y'. Tom then combines the outcomes using an announcement function F:

$$F: X' \times Y' \to \Gamma \quad \gamma \in \Gamma$$
$$Y^\gamma = \{(x', y') \mid F(x', y') = \gamma\}$$

to obtain a classical announcement result $\gamma$.

Tom's announcement strategy is used to produce a classical correlation between Alice's and Bob's data. For any announcement, Alice and Bob are classically correlated within the subset and Eve has some partial information. Using this announcement strategy, the correlations of the legitimate users, Alice and Bob, are intended to suffice to do error correction and privacy amplification independently of Tom.

Tom 120 then announces the announcement result/data $\gamma$ publically. Based on the announcement result, Alice 102 and Bob 104 repartition their data and extract a key rate condition based on the classical announced result:

$$\rho_{ABE} = \sum_\gamma P(\gamma) \rho^\gamma_{ABE} \otimes |\gamma\rangle\langle\gamma| \frac{\otimes^3}{ABE}$$

$$\tilde{\rho}^\gamma_{ABE} = \sum_{x',y' \in Y^\gamma} {}_{T_{S_A S_B}}\left(M^{x'}_{S_A} \otimes M^{y'}_{S_A} |\Psi\rangle\langle\Psi|\right)$$

The final key is extracted from:

$$R = \sum_\gamma P(\gamma) R^\gamma$$
$$R^\gamma = I(A:B \mid \gamma) - x(A:E \mid \gamma)$$

It will be understood that, upon reviewing the present document, various announcement functions (F) may be available. Further, the key rate can be optimized over all possible announcement functions F.

In one particular example of key rates for single links involving infinite key limit, asymmetric basis choice, and key from z-basis, when using 6-state protocol, key rates may be determined from: $R_{\infty,6state}^D[e_x,e_z]=1[e_z]-x[e_x,e_z]$. $1[e_z]=1-h[e_z]$ is the amount the mutual information between Alice 102 and Tom 112 (for only one channel) in which h[x] is the binary entropy. The Holevo quantity in this case is $$x[e_x, e_z] = e_z + (1 - e_z) h\left[\frac{1 - (e_x + e_z/2)}{1 - e_z}\right].$$

When using BB84 protocol, key rates may be determined from $R_{\infty,BB84}^D[e_x,e_z]=1-h[e_z]-h[e_x]$.

As one particular example, it is possible to consider the case of a parity bit announcement. Considering the infinite key limit case, the parity bits PR, may be determined from $F(x', y')=x'\oplus'$.

In the 6-state protocol, if Tom 112 (called "S" in this example—Satellite) is assumed to contribute to parameter estimation, the total state $\rho_{AS_AS_BB}$ and consequently the pure state $|\psi\rangle_{AS_AS_BBE}$ can be constructed from each party's observables. The resulting key rate follows closely that of a direct link but with particular effective rates in the different parts: $R_{\infty,6state}^P[e_x,e_z]=1[E_z]-x[E_x,\overline{E}_z]$.

In the mutual information part of the equation, the error rate is replaced by: $e_z \to \overline{E}_z = e_z^a(1-e_z^b)+e_z^b(1-e_z^a)$. The Holevo quantity changes are:

$$\begin{cases} e_x \to E_x = e_x^a(1 - e_x^b) + e_x^b(1 - e_x^a) \\ e_z \to \overline{E}_z = e_z^a + e_z^b - e_z^b e_z^a \end{cases}.$$

In the BB84 protocol, similar to computation of a secret key for the direct link, an optimization over some constraints is made due to incompleteness of positive-operator valued measure (POVM) elements. The final expression is: $R_{\infty,BB84}^P[e_x,e_z]=1-h[E_z]-h[E_x]$.

Based on initial security proof calculations, embodiments of the QKD protocol described herein are secure against collective attack, which can be extended to the more general case of coherent attacks, by established techniques, for example by using a post selection technique. Also, established techniques will allow for detailed analysis of the effects of finite amounts of signal exchanges.

Figure 7:
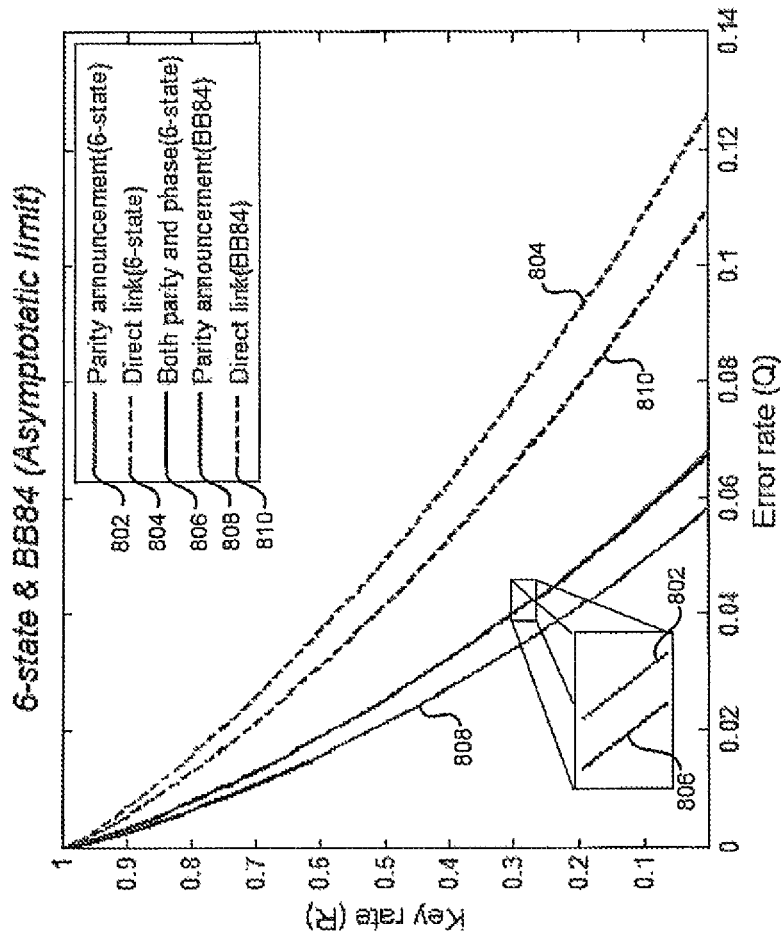
FIG. 7 a graph of a key rate as a function of an error rate, in accordance with an embodiment.

FIG. 7 illustrates anticipated key rates as a function of single link error rate Q for both 6-state and BB84 protocols. Curves 802, 804 indicate 6-state protocol in parity announcement format (i.e. according to embodiments of the systems and methods herein with double link communication) and direct, single link format, respectively. Curves 808, 810 refer to the BB84 protocol in parity announcement format (i.e. according to embodiments of the systems and methods herein) and direct link format, respectively. Lastly, curve 806, which closely follows curve 802, refers to a particular case in which embodiment of the systems and methods herein make use of an announcement by the intermediate node involving both parity and phase values in 6-state protocol. In the case of BB84 protocol, a similar calculation can be done.

In a standard security proof of QKD, the key rate is derived under some assumptions that might not hold in practical QKD. For example, the assumption that legitimate users (Alice, Bob, Tom) can send infinite amount of signal can not hold in practice. In a practical situation, there is a limit on the number of signals transmitted.

Figure 8:
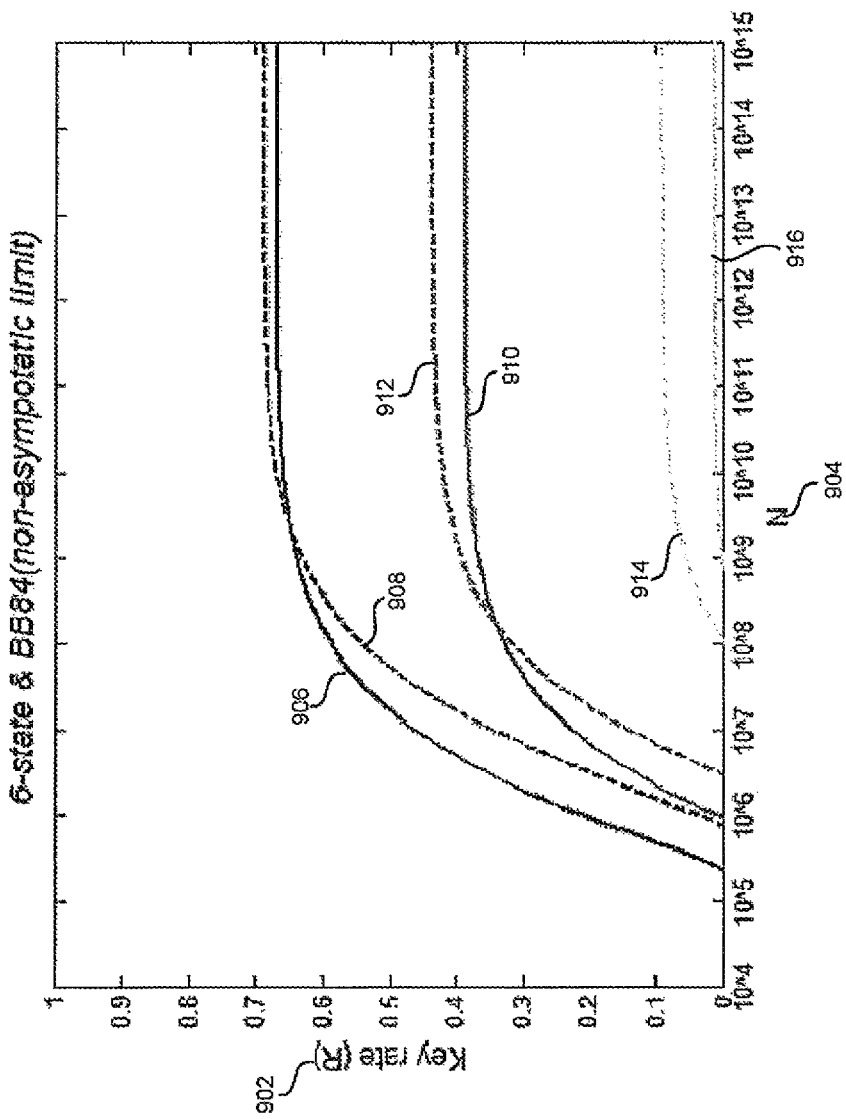
FIG. 8 a graph of a key rate as a function of a total number of exchanged signals, in accordance with an embodiment.

FIG. 8 illustrates a key rate 902 as a function of total number of exchanged signals N 904. The solid curves 906, 910, 916 refer to the BB84 protocol and the dashed curves 908, 912, 914 indicate 6-state protocol. The values of the error rate are Q=0.5% (curves 906, 908), 2% (curves 910, 912), and 5% (curves 914, 916).

In will be understood by one of skill in the art, after understanding the concepts herein, that the systems and methods outlined herein can be extended to other signal sources, such as weak laser pulses and the like, and can also be operated via lossy quantum channels. The protocol described can be used or adapted according to the signal source and channel characteristics. For example, in one simple case, a source such as a weak laser pulse could be used with the same unaltered protocol described above. In another case, the protocol described above may be combined with the established method of decoy states to estimate which fraction of events originate from the ideal qubit implementation, and what the parameter estimation on those signals would yield. From that a new key rate can be calculated and extracted via error correction and privacy amplification.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can Interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for quantum key distribution (QKD), the method comprising:
    executing a quantum phase between the first location (A) and the intermediate location (T) to determine a first location raw data string ($R_A$) at the first location and a first-intermediate raw data string ($R_{AT}$) at the intermediate location (T);
    executing a quantum phase between the second location (B) and the intermediate location (T) to determine a second location raw data string ($R_B$) at the second location (B) and a second-intermediate raw data string ($R_{TB}$) at the intermediate location (T);
    calculating, at the intermediate location (T), announcement data based on a function (F) of the first-intermediate raw data string ($R_{AT}$) and the second-intermediate raw data string ($R_{TB}$);
    announcing, at the intermediary location (T), the announcement data over a classical channel to the first location (A) and the second location (B); and
    deriving, at each of the first and second locations (A, B), a common secret key ($K_{AB}$) based on the first location raw data string ($R_A$), the second location raw data string ($R_B$), and the announcement data and on communications between the first and second locations (A, B) via the classical channel.

2. The method of claim 1, wherein the function (F) is a parity function and the announcement data comprises parity data and measurement bases.

3. The method of claim 2, wherein the announcing announcement data further comprises announcing error correction information.

4. The method of claim 1, further comprising determining an error estimate during the execution of the quantum phase.

5. The method of claim 1, wherein the intermediate location is a plurality of intermediate locations.

6. The method of claim 5, wherein the plurality of intermediate locations each comprise one of a quantum detector and a quantum emitter.

7. The method of claim 1, wherein the deriving a secret key ($K_{AB}$) further comprises performing error correction between the first location (A) and the second location (B) over a classical channel.

8. The method of claim 1, wherein the deriving a secret key ($K_{AB}$) further comprises performing privacy amplification between the first location (A) and the second location (B) over a classical channel.

9. A method for quantum key distribution (QKD) at an intermediate location (T), the method comprising:
    executing a quantum phase with a first location (A) over a quantum channel to obtain a first raw data string ($R_{AT}$) at the intermediate location (T) based on a first location raw data string ($R_A$) determined at the first location (A);
    executing a quantum phase with a second location (B) over a quantum channel to obtain a second raw data string ($R_{TB}$) at the intermediate location (T) based on a second location raw data stringer ($R_B$) determined at the second location (B);
    calculating announcement data based on a function (F) of the first raw data string ($R_{AT}$) and the second raw data string ($R_{TB}$); and
    announcing the announcement data over a classical channel, to each of the first location (A) and second location (B) such that each of the first location (A) and second location (B) are able to derive a common secret key based on the announcement data, the first raw data string ($R_A$) and the second raw data string ($R_B$) respectively for secure communication between the first location (A) and the second location (B).

10. The method of claim 9, wherein the executing the quantum phase with a first location (A) comprises:
    receiving a first quantum signal from the first location (A) over a quantum channel; and
    measuring the first quantum signal to obtain the first raw data string ($R_{AT}$).

11. The method of claim 9, wherein the executing the quantum phase with a second location (B) comprises:

receiving a second quantum signal from the second location (B) over a quantum channel; and measuring the second quantum signal to obtain the second raw data string ($R_{TB}$).

12. The method of claim 9, wherein the function (F) is a parity function and the announcement data comprises parity data and measurement bases.

13. The method of claim 12, wherein the announcing announcement data further comprises announcing error correction information.

14. The method of claim 9, further comprising determining an error estimate during the execution of the quantum phase.

15. A system for quantum key distribution (QKD) at an intermediate location (T), the system comprising:

a quantum system configured to execute a quantum phase with a first location (A) over a quantum channel to obtain a first raw data string ($R_{AT}$) at the intermediate location (T) and execute a quantum phase with a second location (B) over a quantum channel to obtain a second raw data string ($R_{TB}$) at the intermediate location T based on a first raw data string ($R_A$) and a second raw data string ($R_B$) are determined at the first location A and the second location (B) respectively;

a processor for calculating announcement data based on a function (F) of the first raw data string ($R_{AT}$) and the second raw data string ($R_{TB}$); and a classical system configured to announce the announcement data over a classical channel to each of the first location (A) and second location (B), such that each of the first location (A) and second location (B) are able to derive a common secret key based on the announcement data, the first raw data string ($R_A$) and the second raw data string ($R_B$) respectively for secure communication between the first location (A) and the second location (B).

16. The system of claim 15, wherein the function (F) is a parity function and the announcement data comprises parity data and measurement bases.

* * * * *